US009782727B2

(12) United States Patent
Dubois et al.

(10) Patent No.: US 9,782,727 B2
(45) Date of Patent: Oct. 10, 2017

(54) FILTRATION MEMBRANES WITH FUNCTIONALIZED STAR POLYMERS

(71) Applicant: International Business Machines Corporation, Armonk, NY (US)

(72) Inventors: Geraud J. Dubois, Los Altos, CA (US); Victor Y. Lee, San Jose, CA (US); Robert D. Miller, San Jose, CA (US); Young-Hye Na, San Jose, CA (US); Joseph Sly, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 14/330,801

(22) Filed: Jul. 14, 2014

(65) Prior Publication Data

US 2016/0008769 A1    Jan. 14, 2016

(51) Int. Cl.
| | |
|---|---|
| *B01D 69/12* | (2006.01) |
| *B01D 71/82* | (2006.01) |
| *B01D 67/00* | (2006.01) |
| *B01D 61/02* | (2006.01) |
| *B01D 69/02* | (2006.01) |

(Continued)

(52) U.S. Cl.
CPC ....... *B01D 69/125* (2013.01); *B01D 67/0006* (2013.01); *B01D 69/02* (2013.01); *B01D 69/12* (2013.01); *B01D 71/80* (2013.01); *B01D 61/027* (2013.01); *B01D 71/82* (2013.01); *B01D 2323/02* (2013.01); *B01D 2323/30* (2013.01); *B01D 2323/345* (2013.01); *B01D 2323/36* (2013.01); *B01D 2325/04* (2013.01); *B01D 2325/14* (2013.01); *B01D 2325/16* (2013.01); *B01D 2325/18* (2013.01); *B01D 2325/26* (2013.01); *B01D 2325/36* (2013.01); *C08F 293/005* (2013.01); *C08F 2438/01* (2013.01)

(58) Field of Classification Search
None
See application file for complete search history.

(56) References Cited

U.S. PATENT DOCUMENTS

| | | | |
|---|---|---|---|
| 4,087,388 | A | 5/1978 | Jensen et al. |
| 4,277,344 | A | 7/1981 | Cadotte |
| | | (Continued) | |

FOREIGN PATENT DOCUMENTS

| | | |
|---|---|---|
| CN | 1394901 A | 2/2003 |
| CN | 101053779 A | 10/2007 |
| | (Continued) | |

OTHER PUBLICATIONS

Decher et al. "Buildup of ultrathin multilayer films by a self-assembly process: III. Consecutively alternating adsorption of anionic and cationic polyelectrolytes on charged surfaces" Thin Solid Films, 210/211, 1992, Elsevier Sequoia, pp. 831-835.

(Continued)

*Primary Examiner* — Krishnan S Menon
*Assistant Examiner* — Ryan B Huang
(74) *Attorney, Agent, or Firm* — Shumaker & Sieffert, P.A.

(57) ABSTRACT

A thin film composite membrane (TFC) includes an active layer on a support. The active layer includes at least 8 barrier layers of star-polymers each having at least three linear polymers attached at a central core. Each of the barrier layers has a thickness between 5 and 50 nm, and the barrier layers have alternating charge.

6 Claims, 8 Drawing Sheets

(51) Int. Cl.
  *B01D 71/80* (2006.01)
  *C08F 293/00* (2006.01)

(56) References Cited

U.S. PATENT DOCUMENTS

| | | | |
|---|---|---|---|
| 4,704,324 | A | 11/1987 | Davis et al. |
| 7,365,142 | B2 | 4/2008 | Schlenoff et al. |
| 7,713,544 | B2 | 5/2010 | Chaikof et al. |
| 7,825,199 | B1 | 11/2010 | Matyjaszewski et al. |
| 7,918,349 | B2 | 4/2011 | Mickols et al. |
| 8,011,517 | B2 | 9/2011 | Allen et al. |
| 8,061,533 | B2 | 11/2011 | Mays et al. |
| 8,110,679 | B2 | 2/2012 | Kriesel et al. |
| 8,505,743 | B2 | 8/2013 | Sarkar et al. |
| 8,727,135 | B2 | 5/2014 | Cheng et al. |
| 2007/0037933 | A1 | 2/2007 | Kurth et al. |
| 2007/0251883 | A1 | 11/2007 | Niu |
| 2008/0135482 | A1 | 6/2008 | Singh et al. |
| 2009/0053139 | A1 | 2/2009 | Shi et al. |
| 2009/0114596 | A1 | 5/2009 | Kriesel et al. |
| 2009/0203980 | A1 | 8/2009 | Carlson et al. |
| 2011/0076504 | A1* | 3/2011 | Van De Weerdt .... C08F 220/34 428/463 |
| 2011/0207841 | A1 | 8/2011 | Kosar et al. |
| 2011/0305872 | A1 | 12/2011 | Li et al. |
| 2012/0048799 | A1 | 3/2012 | Na et al. |
| 2012/0241373 | A1* | 9/2012 | Na ................. B01D 69/12 210/500.38 |
| 2013/0146521 | A1 | 6/2013 | Brozell et al. |

FOREIGN PATENT DOCUMENTS

| | | |
|---|---|---|
| CN | 102688701 A | 9/2012 |
| CN | 102711967 A | 10/2012 |
| KR | 11238591 B1 | 2/2012 |
| KR | 101123859 B1 | 2/2012 |

OTHER PUBLICATIONS

Su et al. "Preparation and performance of dynamic layer-by-layer PDADMAC/PSS nanofiltration membrane" Journal of Membrane Science 423-424, 2012, pp. 324-331.

Zhao et al. "Porous membranes modified by hyperbranched polymers II. Effect of the arm length of amphiphilic hyperbranched-star polymers on the hydrophilicity and protein resistance of poly (vinylidene flouride) membranes" Science Direct, Journal of Membrane Science 304, 2007, pp. 138-147.

Jin et al. "Use of Polyelectrolyte Layer-by-Layer Assemblies as Nanofiltration and Reverse Osmosis Membranes", Langmuir, Feb. 10, 2003, 19, 2550-2553.

Zhao et al. "Improving Hydrophilicity and Protein Resistance of Poly(vinylidene flouride) Membranes by Blending with Amphiphilic Hyperbranched-Star Polymer", Lanmuir 2007, 23, 5779-5786.

Cima et al. "Network Structures of Radiation-Cross-linked Star Polymer Gels" Macromolecules, 1995, 28, 6787-6794.

Pereira Nunes et al. "Membrane Technology in the Chemical Industry" Second, Revised and Extended Edition, Wiley-VCH GmbH & Co. KGaA, 2006, 358 pgs.

Petersen, Robert J. "Composite Reverse Osmosis and Nanofiltration Membranes" Journal of Membrane Science, 83, 1993, pp. 81-150.

Zhang et al., "Well-constructed cellulose acetate membranes for forward osmosis: Minimized internal concentration polarization with an ultra-thin selective layer," Journal of Membrane Science 360, 2010, pp. 522-535.

Wang et al., "Enhanced forward osmosis from chemically modified polybenzimidazole (PBI) nanofiltration hollow fiber membranes with a thin wall," Chemical Engineering Science 64, 2009, pp. 1577-1584.

Cath et al., "Forward osmosis: Principles, applications, and recent developments," Journal of Membrane Science 281, 2006, pp. 70-87.

Wei et al., "Synthesis and characterization of flat-sheet thin film composite forward osmosis membranes," Journal of Membrane Science 372, 2011, pp. 292-302.

Zhao et al., "Recent developments in forward osmosis: Opportunities and challenges," Journal of Membrane Science 396, 2012, 21 pp.

Kim et al., "Bio- and oil-fouling resistance of ultrafiltration membranes controlled by star-shaped block and random copolymer coatings,", RSC Advances, 2013, 3, 18071-18081 pp.

Kim et al., "The increase of antifouling properties of ultrafiltration membrane coated by star-shaped polymers," RSC Advances, 22, 2012, pp. 8654-8661.

U.S. Appl. No. 14/623,313, filed Feb. 16, 2015, by Dubois et al.
U.S. Appl. No. 14/623,352, filed Feb. 16, 2015, by Dubois et al.
"List of IBM Patents or Patent Applications Treated as Related," Appendix P, 2 pp.

International Search Report and Written Opinion from International Application No. PCT/IB2015/055284, mailed Dec. 18, 2015 10 pgs.

\* cited by examiner

Red Congo

Mw: 696.7, Size: 10.1 Å

FILTRATION MEMBRANES WITH FUNCTIONALIZED STAR POLYMERS

BACKGROUND

Membrane technologies such as microfiltration (MF), ultrafiltration (UF), nanofiltration (NF), and reverse osmosis (RO) are energy efficient and cost-effective ways for water purification and other liquid separations. NF membranes have been widely used for brackish water treatment, waste water reclamation, and water softening because they require relatively low operating pressure compared to RO. NF membranes also retain high water flux with good filtration efficiency toward small organic contaminants and multivalent ionic species, which cannot be easily removed by porous UF or MF membranes.

Figure 1:
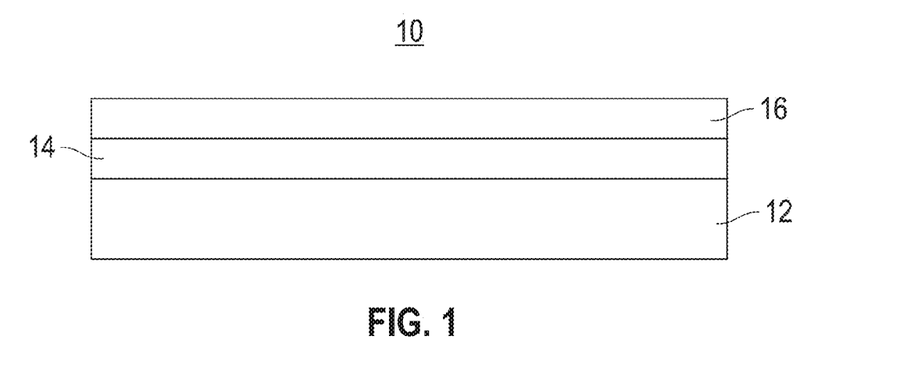
FIG. 1 is a schematic, cross-sectional view of a nanofiltration (NF) membrane.

Referring to FIG. 1, a NF membrane 10 includes a support web 12, a porous midlayer 14, typically a polysulfone (PSF), and a barrier layer 16. This multilayer construction is referred to as a Thin Film Composite membrane (TFC). The barrier layer plays an important role in controlling separation performance, while the support layers provide sufficient mechanical strength so that the TFC composite membrane 10 can endure external operating pressure.

SUMMARY

Commercial NF membranes made by interfacial polymerization of diamines and acid chlorides remove small organic contaminants and ionic species with reasonably high water flux. However, control of membrane fouling (pore-clogging or physical adsorption of organic contaminants on the membrane surface) and further flux enhancement are desirable to increase membrane life and to reduce overall operating costs.

In general, the present disclosure relates to fouling resistant, highly water-permeable NF membranes including an active layer of layered functionalized star polymers. In various embodiments, layer-by-layer (LBL) deposition of star polymers with alternating charges on a porous support substrate forms a dense active layer. The star polymers making up the barrier layers in this active layer have a well-defined globular structure with highly dense external functional groups that can be selected to enhance separation performance and mitigate membrane fouling.

In one embodiment, the present disclosure is directed to a thin film composite membrane (TFC) including an active layer on a support. The active layer includes at least 8 barrier layers of star-polymers, wherein the star polymers include at least three linear polymers attached at a central core. Each of the barrier layers has a thickness between 5 and 50 nm, the barrier layers having alternating charge.

In another embodiment, the present disclosure is directed to a method for making a membrane, including: a) exposing a surface of a support membrane having a first surface potential to a first solution to form a first charged barrier layer on the surface, wherein the first solution includes a first star polymer in a first solvent, and wherein the first star polymer has a second surface potential opposite the first surface potential; b) exposing the first charged barrier layer to a second solution to form a second charged barrier layer on the first charged barrier layer, wherein the second solution includes a second solvent and a second star polymer having a third surface potential opposite the second surface potential; and c) repeating steps a) and b) to form a multilayer stack of self-assembled star polymers on the support membrane.

In some embodiments, the lateral self-assembling behavior of a sphere-shaped star polymer can provide a thin polymer film with high packing density and reduced defects. In some embodiments, the space between the sphere-shaped star-polymers can generate extra free volume, which can increase water permeability by providing a percolation path for water molecules. In some embodiments, star polymers can be designed to contain mixed functional groups of charged species to provide a wide range of desired benefits. For example, charged species can be selected to provide LBL assembly by electrostatic interaction and/or hydrogen bonding to enhance film formation. In another example, neutral hydrophilic moieties can provide fouling control and more effectively suppress flux decline caused by membrane fouling during long-term NF operation.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like numerals in the drawings indicate like elements.

DETAILED DESCRIPTION

Figure 2:
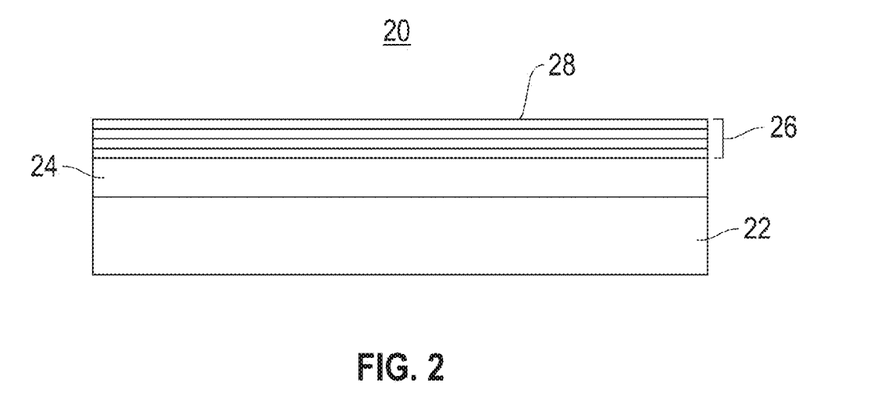
FIG. 2 is a schematic, cross-sectional view of a NF membrane including a barrier layer of layered functionalized star polymers.

Referring to FIG. 2, a nanofiltration (NF) membrane 20 includes a support web 22, a porous support 24, and an active layer 26. In various embodiments, the active layer 26 is made up of a plurality of layers 28 of functional star polymers.

The porous support 24 overlain by the active layer 26 can vary widely depending on the intended application, can be flexible or rigid, and can include an organic material, an inorganic material, a hybrid organic-inorganic material, a metal material, or a combination of the foregoing materials. Exemplary organic materials for the support 24 include cellulose acetates, cellulose nitrates, regenerated celluloses, polysulfones, polyethersulfones, polypiperazine amides (such as those available under the trade designation FILMTEC from Dow Chemical, Midland, Mich.), polyacrylonitriles and copolymers, track-etched polyesters (e.g., those sold under the trade designation CYCLOPORE by Whatman Ltd.), polycarbonates (e.g., those sold under the trade designation NUCLEPORE by Whatman Ltd), poly (vinylidene difluoride), polypropylenes, Nylon 6,6, poly (tetrafluoroethylene)s (e.g., those sold under the trade names PORO-TEX and PARA-TEL by DeWAL Industries), and combinations of the foregoing materials. Exemplary inorganic materials for the active layer of the stock membrane include nanoporous alumina ($Al_2O_3$) (e.g., those sold under the trade name ANOPORE by Whatman Ltd.), beryllia (BeO), titania ($TiO_2$), zirconia ($ZrO_2$), silica ($SiO_2$), magnesia (MgO), calcia (CaO), yttria ($Y_2O_3$), strontia (SrO), lanthana ($La_2O_3$), hafnia ($HfO_2$), oxides of iron, manganese oxide (MnO), carbides, nitrides, silicides, and combinations of the foregoing materials. Exemplary metals that may be included in the porous support 24 include, for example, nickel, nickel alloys, and stainless steel.

The porous support 24 has an average pore diameter of about 1 to about 1000 nm, about 1 to 100 nm (0.1 micrometer), about 1 to 50 nm, about 2 to about 30 nm, and even more particularly about 5 to about 20 nm. In this application the term "pores" refers to regular and irregular voids and/or channels extending from one face to an opposite face of the porous support. Microfiltration (MF) stock membranes have an average pore size of about 0.1 micrometers and a molecular weight cutoff of about 500,000 Daltons. Ultrafiltration (UF) stock membranes have an average pore size of about 0.01 micrometers to about 0.1 micrometers and a molecular weight cutoff of about 1,000 Daltons to 500,000 Daltons. The pore size of poly(sulfone) (PSF) ultrafiltration stock membrane used in the examples below is about 5 to about 20 nm.

The porous support 24 can have a thickness of 1 micrometer to 10 millimeters, more particularly 1 micrometer to 100 micrometers, more particularly 1 micrometer to 80 micrometers, and even more particularly 1 micrometer to 50 micrometers.

In some embodiments, the porous support 24 can optionally be underlain by a support layer 22, which may be, for example, another membrane, a woven or a non-woven fibrous material, a polymeric film or a paper layer.

The active layer 26 is made of a plurality of layers 28 of star polymers stacked on one another. In this disclosure the term "star polymer" refers to branched polymers made of a plurality of linear polymers (at least three) attached at a central core. The core, or the center, of the star polymer can be an atom, molecule, or macromolecule, and in some embodiments may itself be multifunctional. The chains, or "arms," of the star polymer consist of variable-length organic chains, which can be made of similar or different polymers. The arms can be chemically identical (homostars) or different (heterostars or Miktoarm stars). In other embodiments, the arms may be composed of multiple monomers or polymers, resulting in star-block polymers or random star copolymers.

Star-shaped polymers can be synthesized through various approaches. The most common syntheses include an arm-first approach, in which the living chains are used as the initiators, and a core-first approach, in which the core is used as the initiator. Other synthetic routes include: controlled sol-gel processes, group transfer polymerization, transition metal catalysis, living anionic polymerization, living cationic polymerization, ring opening polymerization, ring-opening metathesis polymerization (ROMP), atom transfer radical polymerization (ATRP), reversible addition-fragmentation chain transfer polymerization (RAFT) and nitroxide mediated radical polymerization.

The Matyjaszewski group at Carnegie Mellon University provides general information regarding the structure and synthesis of various star copolymers at a site given by the concatenation of "cmu.edu" and "maty/materials/Polymers_with_specific_Architecture/star-copolymers.html", which is incorporated herein by reference.

While a wide variety of star polymers may be used to form the barrier layers 28 in the active layer 26 of the NF membrane 20, in some embodiments the functional groups on the arms of the star polymers are selected so that the star polymers "self-assemble" to form the active layer 26. In some embodiments, the term "self-assemble" means the star polymers align and overlie one another in an organized structure or pattern of building blocks to form the layers 28 of the active layer 26 as a consequence of specific, local interactions among the functional groups on the arms. The interactions between the functional groups, which can be, for example, the result of any of electrostatic charge interaction or electronic (e.g charge transfer) interaction or hydrogen bonding or metal-ligand interaction, cause the star polymers to align to form individual barrier layers. The layers lie down one over the other without external direction to form an arrangement of overlying individual barrier layers.

For example, if the porous support membrane has a first surface potential (either positive or negative), a first star polymer may be selected having functional groups on its arms with a second surface potential opposite the first surface potential. When the first star polymer is applied to the porous support membrane, electronic charge interaction and/or hydrogen bonding will cause the first star polymer to adhere to the support membrane and form a self limiting first individual barrier layer thereon. A second star polymer may then be selected having functional groups on its arms with a third surface potential opposite the second surface potential of the first star polymer. When the second star polymer is applied on the first star polymer, electronic charge interaction and/or hydrogen bonding will cause the second star polymer to lie down on and adhere to the first star polymer, forming a second individual barrier layer thereon. Another first star polymer may then be applied on the second barrier layer to form a third individual barrier layer thereon, and another second star polymer may be applied on the third barrier layer to form a fourth barrier layer. The first star polymer and the second star polymer may be successively applied like building blocks to form multiple layer pairs in this manner until the active layer is formed.

Figure 3:
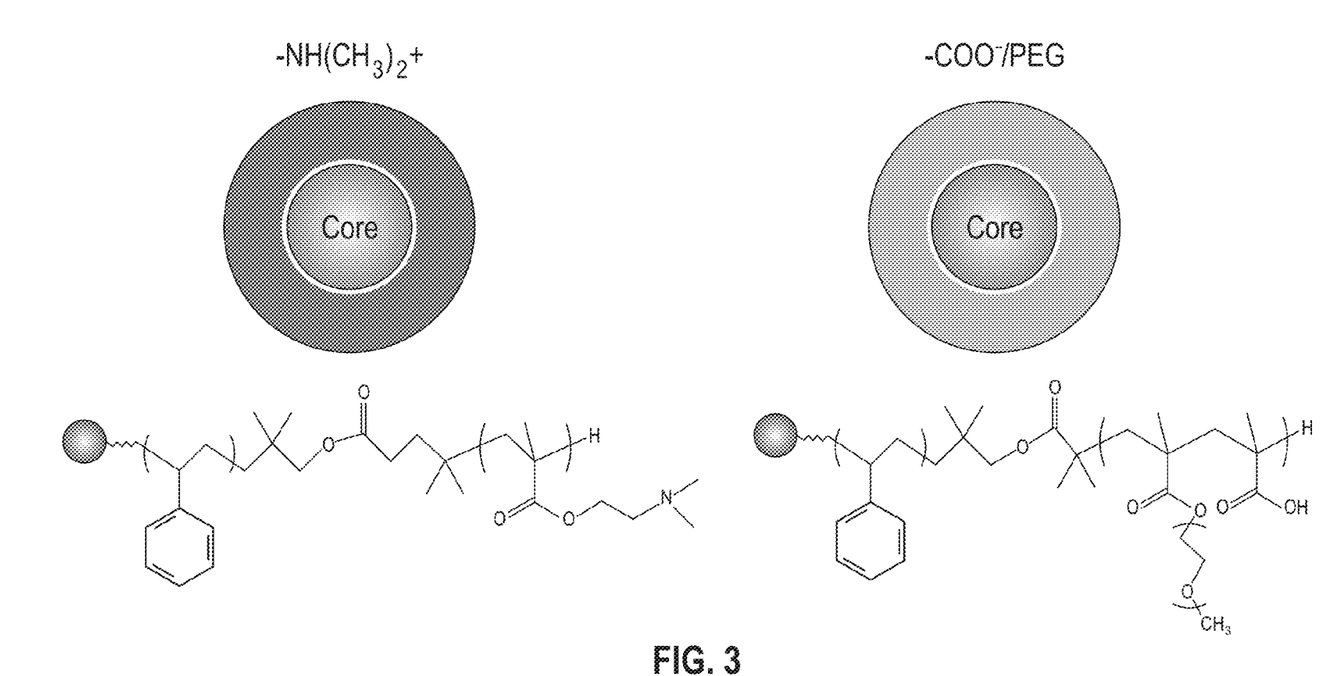
FIG. 3 is a schematic view of a structure having positively and negatively charged star polymers.

For example, in one embodiment a first globularly shaped star polymer with a globular core and at least some arms functionalized with ammonium moieties to provide a positive surface charge was paired with a second globular shaped star polymer having a globular core and arms containing mixed functional groups of negatively charged carboxylate ($COO^-$) and electrically neutral hydrophilic poly(ethylene glycol) (PEG) or zwitterionic moieties to provide a negative surface charge. Schematic diagrams of these star polymers are shown in FIG. 3.

In various embodiments, other positively-charged moieties for the arms of star polymers, which can potentially cause the positively-charged star polymers to electrostatically self-assemble with star polymers having negatively-charged moieties on their arms include, but are not limited to, ammonium, phosphonium and sulfonium cations, as well as functional groups reasonably anticipated to become cationic in aqueous or acidic solution such as, for example, amines.

Non-limiting examples of useful negatively-charged moieties for the arms of star polymers, which can potentially cause the negatively-charged star polymers to electrostatically self-assemble with star polymers having positively-charged moieties on their arms include, but are not limited to, carboxylates, sulfonates, sulfinates, phosphates, phosphinates, phosphonates and hydroxamic acids.

Non-limiting examples of other useful moieties for the arms of star polymers, which can be used to potentially cause the star polymers to self-assemble with other star polymers using hydrogen bonding include, but are not limited to, hydrogen donors including alcohols or weak acids (COOH) with hydrogen acceptors containing ketones (for example, poly(N-vinylpyrrolidone)), amide (for example, poly(N-isopropylacrylamide), ureas, thioureas, guanidines and alkylene oxide (for example, polyethylene oxide) moieties.

Figure 4:
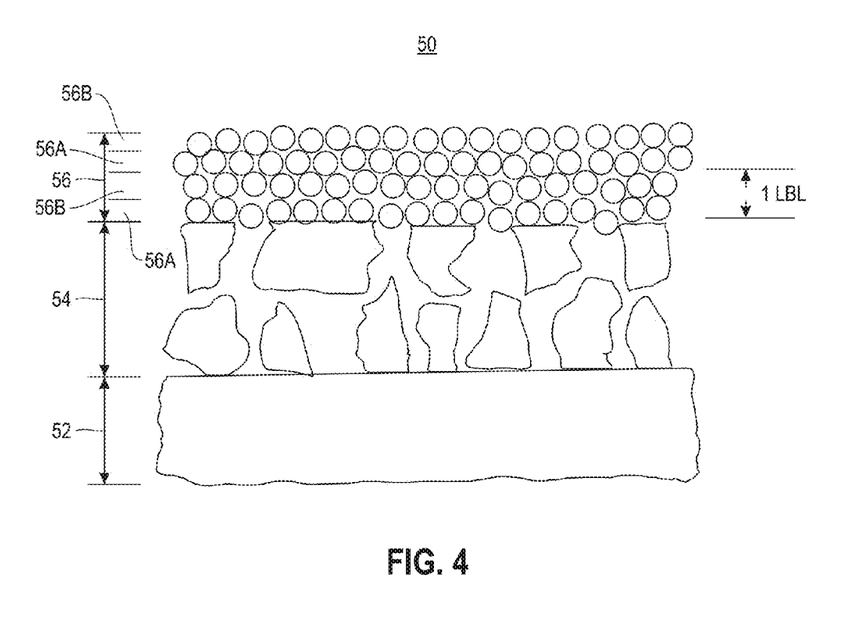
FIG. 4 is a schematic cross-sectional view of a layer-by-layer (LBL)-assembled thin film composite NF membrane.

Referring to FIG. 4, a NF membrane construction 50 includes a support web 52, a porous support 54 (for example, an ultrafiltration (UF) or microfiltration (MF) membrane), and an active layer 56. The active layer 56 includes pairs of alternating barrier layers of the positively charged star polymers 56A and the negatively charged star polymers 56B. The barrier layers are laid down on one another layer-by-layer (LBL) on the porous support 54 to form thereon a self-assembled arrangement. The assembly may be constructed by dipping, spinning or spraying.

In various embodiments, the barrier layers have a thickness of about 5 nm to about 50 nm, or about 5 nm to about 20 nm.

While any number of barrier layers may be applied to the substrate, in various embodiments at least 4, at least 6, at least 8, or at least 10 barrier layers have been applied to provide a membrane with optimum filtration performance and surface properties.

In various embodiments, an active layer for a NF membrane can be prepared by preparing solutions of star polymers with positively-charged functional groups on the arms (SPP) and solutions of star polymers with negatively-charged (SPN) polymers on the arms. Any solvent that can dissolve the star polymers, but is a non-solvent for the supporting membranes may be used, and suitable examples include, but are not limited to, alcohols, halogenated solvents, aromatic solvents, and aqueous solvents. Aqueous solvents, alcohols, and water have been found to be particularly useful.

The solutions of the SPP and SPN star polymers can be applied in serial order through multiple cycles of layer-by-layer (LBL) assembly to form the barrier layers on the porous substrate. The SPP and SPN star polymer solutions may be applied to the substrate in any order, and optional water rinses may be conducted between applications to rinse away unreacted polymer. As shown in FIG. 4, 1 LBL is defined as 1-deposition cycle to form a bi-layer stack of positively-charged star polymers (SPP) and negatively-charged star polymers (SPN). In various embodiments, at least 4 LBL are used to provide a membrane with desirable surface characteristics and filtration properties.

In various embodiments, chemical or physical treatments (e.g., plasma or UV-ozone) can optionally be applied to the support prior to applying the star polymer solutions, to increase the packing-density of the first layer on the surface of the support. More details of the NF membranes of the present disclosure will now be shown in the following non-limiting examples. For deposition of highly charged polymers, the initial layer may be chosen based on the surface potential of the porous support membrane.

EXAMPLES

Materials:
Materials used in the following examples are listed in Table 1.

TABLE 1

| ABBREVIATION | DESCRIPTION | SOURCE |
| --- | --- | --- |
|  | 3-(tert-Butyldimethylsilyloxy)-1-Propyl Lithium | Gelest |
|  | Styrene | Aldrich |
| p-DVB | para-Divinylbenzene | Prepared as described below |
| $Bu_4N^+F^-$ | Tetrabutylammonium Fluoride | Aldrich |
|  | 2-Bromoisobutyryl Bromide | Aldrich |
| DMEAMA | N,N-Dimethylaminoethyl Methacrylate | Aldrich |
|  | 4,4'-Nonyl-2,2'-Bipyridine | Aldrich |
| PBS | 10× Phosphate Buffered Saline | EMD Chemicals |
| PSF | Porous Polysulfone Support (MWCO = 20 kDa) | Sepro |
| Schott SF11 | Glass substrate for SPR study (Diameter: 1 inch) | Stefan Sydor Optics | p-Divinylbenzene (p-DVB) was prepared according to the procedure described by Y. Le Bigot, M. Delmas and A. Gaset, "A Simplified Wittig Synthesis Using Solid/Liquid Transfer Processes IV—Synthesis of symmetrical and asymmetrical mono- and di-olefins from terephtalic aldehyde," *Synthetic Communications*, 1983, 13(2), 177-182.

Instrumentation:
Nuclear Magnetic Resonance Spectroscopy (NMR):
$^1$H NMR spectra of star polymers were obtained on a Bruker Avance 2000 spectrometer (400 MHz) using 5 mm outside diameter (o.d.) tubes and were referenced to internal solvent residue ($^1$H, CDCl$_3$: delta=7.24).

Gel Permeation Chromatography (GPC):
GPC using Waters high resolution columns HR1, HR2, HR4E and HR5E (flow rate 1 mL/min, THF) was used to determine molecular weight distributions, $M_w/M_n$, of polymer samples with respect to linear polystyrene standards.

Surface Plasmon Resonance Spectroscopy (SPR):
SPR was conducted using a two arm reflectometer in an ATR (attenuated total reflection) configuration. P-polarized laser light (854 nm) was directed along a radius of a hemicylindrical BK7 glass prism, which was contacted (using index-matching liquid) to a Schott SF11 glass substrate on which was deposited: a 3 nm thermally-evaporated Cr adhesion layer, a 50 nm thermally-evaporated Au layer, and a 4 nm sputtered SiO$_2$ layer (pre-cleaned before contact with sample solutions using UV/ozone treatment). These elements were pressed against a Kel-F flow cell into which had been milled an elliptical pocket (0.5 mm deep with axes 7.0 by 2.1 mm, volume 40.8 μl), into which sample solutions could be introduced. The source and collection arms of the reflectometer could be counter-rotated at equal and opposite angles of incidence with an angular resolution of 0.001 degrees and directed the laser light onto the prism normal to the prism surface at all angles, allowing the light to impinge onto the sample without refraction over angles of incidence from 15 to 90 degrees. The source consisted of the laser diode, a polarizer and compensation optics to correct for the optical power introduced by the hemicylindrical prism. The collection optics imaged the light reflected from the sample onto a silicon detector. The optically probed region on the sample was fixed at the center of rotation of the arms and the reflected light intensity as a function of the angle of incidence was recorded.

Atomic Force Microscopy (AFM):

AFM images of LBL-assembled membranes were obtained using a Digital Instruments 3100 atomic force microscope operating in tapping mode with a cantilever of ~3 $Nm^{-1}$ spring constant.

UV-Visible Spectroscopy:

Dye-rejection ratio for LBL-assembled membranes and an unmodified membrane was determined by measuring UV-absorption intensities of feed and permeate solutions using HP/Agilent 8453 Diode Array UV/VIS Spectrophotometer.

Example 1

Synthesis of Amine-Functionalized Star Polymer (SPP, Positively Charged Star Polymer)

The SPP was prepared according to reaction Scheme 1 below.

Scheme 1

-continued

ISP-2

Nanogel Core | Intermediate Polymer Arm 2

ISP-3

DMAEMA a~33
n~32
k~35

Nanogel Core — Polymer Arm

SP-1

Preparation of ISP-1.

3-(tert-Butyldimethylsilyloxy)-1-propyl lithium (6.6 mL, about 10 wt % solution in cyclohexane based on total weight of the solution) was added to a stirred solution of styrene (12.00 mL, 104.0 mmol) in a cyclohexane (200 mL) and THF (10 mL) mixture under an argon atmosphere. After 20 minutes an aliquot (approximately 2 mL) was taken, quenched in degassed MeOH (approximately 150 mL) and a representative sample of the "free" polystyrene arm collected by filtration. (data for free arm: $^1$H NMR (400 MHz, CDCl$_3$, delta)=7.12 (br s, 99H), 6.50-6.70 (br m, 66H), 3.45 (br s, 2H), 1.90 (br s, 33H), 1.46 (br s, 66H), 1.03 (br s, 4H), 0.87 (br s, 9H), 0.00 (br s, 6H). Analytical GPC: $M_n$=3300, $M_w/M_n$=1.03. These data implied an average degree of polymerization=33). A mixture of para-divinylbenzene (2.70 mL, 19.0 mmol) and styrene (0.12 mL, 1.05 mmol) in cyclohexane (3.00 mL) was added and the reaction mixture stirred for a further 40 minutes. The reaction solution was then quenched by slow addition to a rapidly stirred solution of MeOH and EtOH (1.5 L, 1:1 v/v). The precipitate formed was isolated by filtration and air dried to a constant weight. The crude star-polymer was then dissolved in CH$_2$Cl$_2$ (100 mL) before the slow addition of acetone (150 mL) and then isopropyl alcohol (30 mL). The solution was allowed to stand until the product formed a substantial oily layer on the bottom of the container. The mixture was decanted allowing isolation of the oil which was then dried in a vacuum oven to constant weight affording the intermediate star-polymer ISP-1 (9.5 g). $^1$H NMR (400 MHz, CDCl$_3$, delta)=7.12 (br s, 99H), 6.50-6.70 (br m, 66H), 3.45 (br s, 2H), 1.90 (br s, 33H), 1.46 (br s, 66H), 1.03 (br s, 4H) 0.87 (br s, 9H), 0.00 (br s, 6H). DLS (THF): $M_w$=104,000 g/mol, $M_w/M_n$=1.12, $R_h$=5.5 nm. (These data implied an average arm number of 31 per star polymer.)

Preparation of ISP-2.

ISP-1 (9.0 g) was dissolved in THF (90.0 mL) and tetrabutylammonium fluoride (Bu$_4$N$^+$F$^-$) (1.0 M solution in THF, 10.0 mL) was added. The reaction solution was stirred for 24 hours at room temperature before being warmed to 50° C. for 1 hour. The solution was allowed to cool to room temperature before it was slowly added to MeOH (1 L) with rapid stirring. The precipitate formed was isolated by filtration and air dried to a constant weight to afford deprotected ISP-2 (8.5 g). $^1$H NMR (400 MHz, CDCl$_3$, delta)=7.12 (br s, 99H), 6.50-6.70 (br m, 66H), 3.45 (br s, 2H), 1.90 (br s, 33H), 1.46 (br s, 66H), 1.03 (br s, 4H). Analytical GPC: $M_n$=3300, $M_w/M_n$=1.03. Analytical GPC: $M_w/M_n$=1.14. Light Scattering: $M_w$=103 000 g/mol, $M_w/M_n$=1.14, $R_h$ (THF, average) 5.5 nm.

Preparation of ISP-3.

A solution of 2-bromoisobutyryl bromide (1.4 g, 4 equivalents per star polymer alcohol end group) in anhydrous dichloromethane (30 mL) was added dropwise over 15 minutes to a solution of deprotected ISP-2 (5.0 g) and triethylamine (0.75 g) in anhydrous dichloromethane (30 mL) at 0° C. The mixture was allowed to warm up to room temperature for 14 hours, then heated to a gentle reflux for 4 hours. The product intermediate polymer ISP-3 was obtained after repeated precipitation into methanol (3.7 g). $^1$H NMR (400 MHz, CDCl$_3$, delta)=7.12 (br s, 99H), 6.50-6.70 (br m, 66H), 3.78 (br s, 2H), 1.90 (br s, 33H), 1.46 (br s, 66H), 1.03 (br s, 4H) 0.85 (br s, 6H). Analytical GPC: $M_w/M_n$=1.14. Light Scattering: $M_w$=104 000 g/mol, $M_w/M_n$=1.13, $R_h$ (THF, average) 5.5 nm.

Preparation of Star Polymer SPP.

ATRP-initiator ISP-3 (1.0 g), N,N-dimethylaminoethyl methacrylate (DMAEMA) (4.0 g), copper(I) chloride (70 mg) and PMDETA (N,N,N',N',N"-pentamethyldiethylenetriamine, 50 mg) were dissolved in anisole (50 mL). The solution was degassed and sealed under a nitrogen atmosphere before being heated to 45° C. for 0.5 hours. The reaction solution was then cooled and added to hexane (200 mL) with rapid stirring. The precipitate thus formed was isolated, dissolved in methylene chloride and again added to hexane (200 mL) with rapid stirring. The precipitate thus formed was isolated and air dried to a constant weight to produce star polymer SPP (2 g) as a white solid $^1$H NMR (400 MHz, CDCl$_3$, delta)=7.13 (br s, 99H), 6.50-6.60 (br m, 66H), 4.57 (br s, 66H), 4.01 (br s 66H), 2.33 (br s, 198H), 1.86 (br s, 132H), 1.45 (br s, 66H), 0.90 (br s, 66H), 0.78 (br, s, 6H). Light Scattering: $M_w$=290 000 g/mol, $M_w/M_n$=1.19, $R_h$(THF, average) 12.3 nm.

Example 2

Synthesis of Carboxylate-Functionalized Star Polymer (SPN, Negatively Charged Star Polymer)

The SPN was prepared according to Scheme 2 below.

Scheme 2

-continued

Microgel Core — Polymer Arm

SP-3

$k \geq 6$

Preparation of Star Polymer SPN.

ATRP-initiator peripherally functional polystyrene star polymer ISP-3 (0.3 g), tert-butyl methacrylate (1.2 g), oligo(ethylene glycol)methacrylate (EGM) (DP 4.5, 2.6 g), copper(I) chloride (9.4 mg) and PMDETA (16.5 mg) were dissolved in anisole (12.0 mL). The solution was degassed and sealed under a nitrogen atmosphere before being heated to 45° C. for 1 hour. Tributyltin hydride (0.11 g) was added and the reaction heated at 45° C. for a further 30 mins. The solution was then concentrated to approx. 5 mL before being added to hexane (50 mL) with rapid stirring. The precipitate thus formed was isolated, dissolved in methylene chloride (20 mL) before the addition of diamine-functionalized silica scavenger resin (0.5 g), and the mixture was stirred overnight. The mixture was filtered and the filtrate was again added to hexane (50 mL) with rapid stirring. The precipitate thus formed was dissolved in dioxane (6 mL) before the addition of HCl (10N, 0.2 mL). The solution was then heated at 90° C. for 20 h before being added dropwise to a solution of isopropyl alcohol in hexane (10 wt %). The precipitate was isolated and dissolved in a solution of DMF/Acetone (1:1) before being dialyzed against water, methanol and acetone respectively (MWCO 3.5 kDa). The resulting solution was freeze dried from benzene to afford the final product SP-5 (0.3 g) as a white solid. $^1$H NMR (400 MHz, CDCl$_3$) delta (ppm)=0.90-108 (br m, 107H), 1.36 (br s, 79H), 1.86 (br s, 85H), 3.31 (br s, 46H), 3.50-3.59 (br m, 240H), 4.11 (br s, 32), 6.50-6.60 (br m, 64H), 7.13 (br s, 96H). $M_w$=87,000 g/mol, $M_w/M_n$=1.23, hydrodynamic radius $R_{h(avg)}$=10.0 nm.

Example 3

Monitoring Layer-by-Layer Assembly by Surface Plasmon Resonance (SPR)

Figure 8:
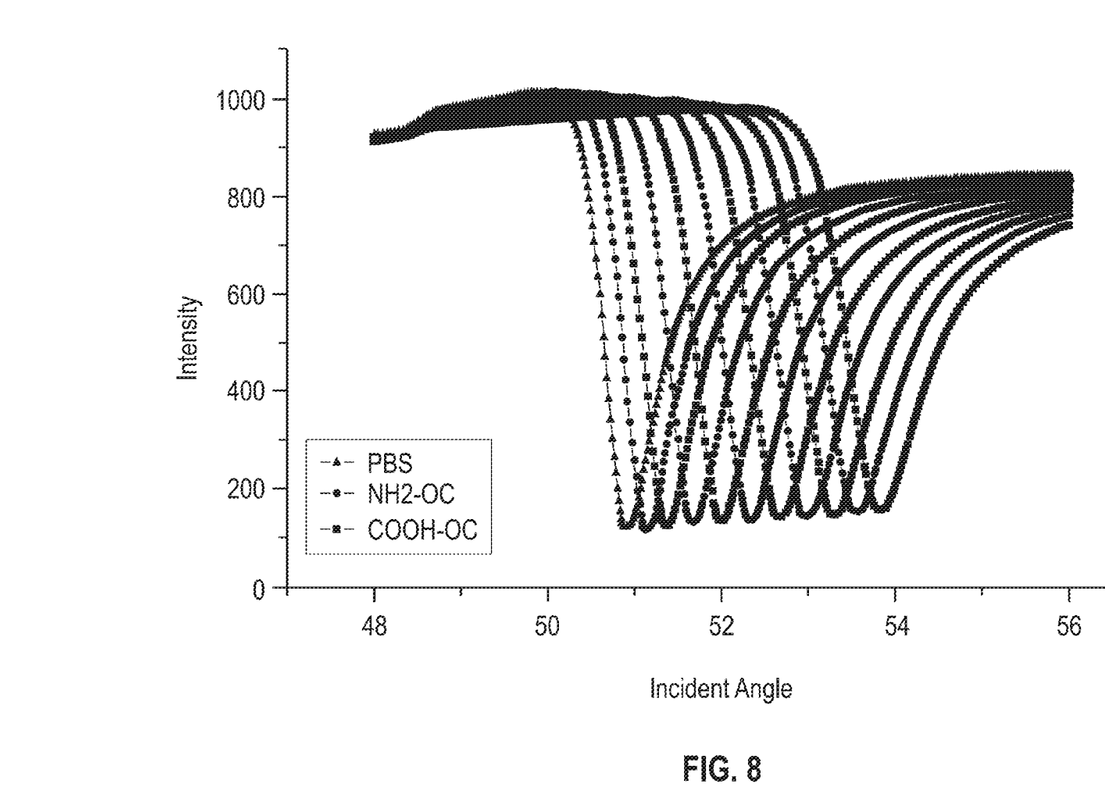
FIG. 8 is an SPR Spectrum showing the shift of the incident angle by LBL-deposition of SPP and SPN star polymers. The curve with the squares shows a background signal with a PBS buffer solution.

To monitor layer-by-layer assembly of star-polymers, SPR analysis was conducted on a glass substrate (Schott SF11) coated with Cr (5 nm), gold (50 nm) and SiO2 (4 nm) in serial order. Exposing the substrate surface to a 0.1% (w/v) aqueous solution of amino-functionalized star-polymer (SPP) followed by a PBS rinse resulted in the shift of a resonance angle from its background signal (black curve with triangles: by 1X phosphate buffer solution), indicating that a thin layer of SPP star-polymer formed on the substrate (curve with circles). Subsequent exposure of the amino-functionalized surface thus formed, to a 0.1% (w/v) aqueous solution of carboxylic acid-functionalized star-polymer (SPN) resulted in a further shift of the resonance angle, verifying SPN deposition on the surface of SPP-modified substrate (curve with squares). Multiple exposures of the resulting substrate to alternating solutions of SPP and SPN in sequential order (the substrate was rinsed with PBS after every star polymer deposition) showed a continued shifting of the resonance angle with very uniform interval demonstrating well-controlled layer-by-layer assembly of molecular-thin films onto the substrate (FIG. 8). The driving force for the film formation presumably arises initially from the strong interaction between acidic surface functionality and the basic peripheral amino groups of star-polymer SPP. Similar interactions between the acidic groups of SPN with the amino-functionalized surface derived from SPP drive the sequential layer-by-layer deposition. This self-assembly process is self-limiting as only polyvalent interactions between the polymer being deposited and the functionality on the surface are of any lasting significance and excess polymer deposition is inhibited to some extent by charge repulsion. Polymer material not interacting directly with the complementarily functionalized surface was readily removed by washing.

Example 4

Fabrication of NF Membranes by Layer-by-Layer Assembly of Star-Polymers

A polysulfone (PSF) UF membrane was pre-treated with UV-Ozone for 40 sec to increase surface negative charge and hydrophilicity. The pre-treated PSF membrane was then placed into a frame and the top surface of the membrane was exposed to a 0.1 wt % aqueous solution of positively charged star polymer (SPP) for 15 min followed by rinsing with deionized water. The SPP-saturated membrane was subsequently exposed to a 0.1 wt % aqueous solution of negatively charged star polymer (SPN) for 15 min and rinsed with deionized water again to obtain a complete cycle of bi-layer deposition (1LBL). The same procedure was repeated to form star-polymer films with 2LBL, 3LBL, and 4LBL thickness. The surface morphology of LBL-assembled membranes and an unmodified PSF membrane was scanned by AFM and is shown in FIG. 5.

Figure 5:
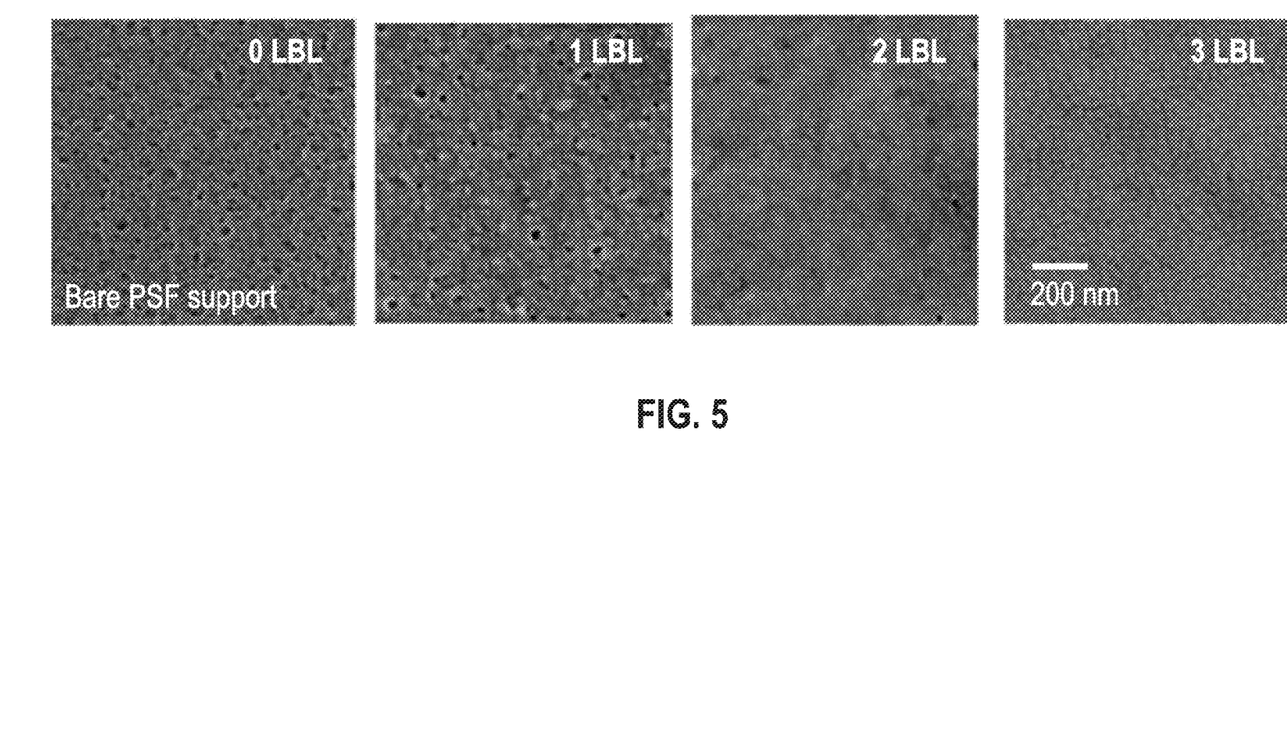
FIG. 5 is a series of SEM top-down images of a thin-film composite membrane. prepared by LBL-assembly of SPP and SPN star polymers on a porous PSF support.

FIG. 5 shows top-down SEM images of thin film composite membranes prepared by LBL-assembly of SPP and SPN star polymers (from 1 LBL to 3 LBL). A bare PSF support showed porous surface structure, and the surface pores were gradually filled up by increasing the cycle of LBL assembly. The membrane prepared by 3-cycles of LBL assembly showed a relatively dense surface structure without noticeable pore-defects.

Example 5

Molecular Dye Filtration with LBL-Assembled Star Polymer Membranes

Filtration was performed by a stirred dead-end filtration cell (available from Sterlitech Corp.) using a molecular dye solution (100 ppm, Red Congo) as the feed. Operating pressure was varied from 20 psi to 100 psi depending on the layer-thickness of star polymer films (OLBL: 20 psi, 1~2LBL: 50 psi, and 3~4 LBL: 100 psi). Dye rejection values were calculated by measuring dye concentrations in the feed and in permeate by using UV-visible spectroscopy (HP/Agilent 8453 Diode Array UV/VIS Spectrophotometer). Flux and Dye-rejection ratio were summarized in FIG. 6 and anti-fouling efficiency of LBL-modified membranes was demonstrated in FIG. 7.

Figure 6:
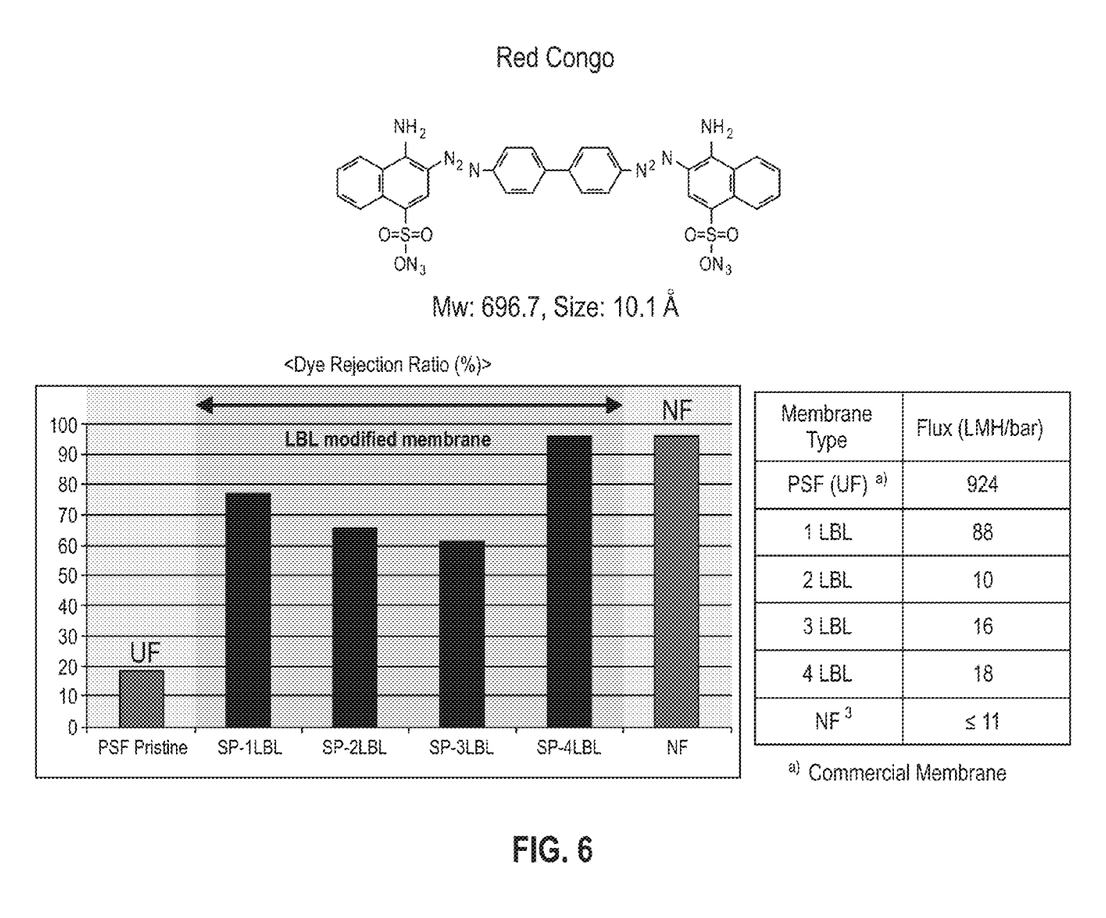
FIG. 6 is a plot of dye rejection ratio (%) (left plot) and water flux (right table) obtained with a unmodified PSF UF membrane, LBL-assembled star polymer membranes (1~4 LBL), and a commercial NF membrane.

To confirm the potential of LBL-assembled star polymers as a barrier layer for nanofiltration, thin film composite membranes coated with star polymers (from 0 LBL to 4 LBL) were subjected to dead-end filtration of a dye-containing solution, and their performance was compared to a commercial nanofiltration membrane. Congo Red, a standard dye molecule with about 1 nm-size (theoretical calculated value), was used for the filtration experiment. As shown in FIG. 6, an unmodified porous PSF UF membrane showed less than 20% rejection of Congo Red, but the rejection ratio significantly increased by depositing star polymers. The star polymer membrane prepared by 4-cycles of LBL assembly showed a high dye rejection rate (ca. 95% dye rejection), which is comparable to a commercial NF membrane, with even higher water flux (18 LMH/bar) than the commercial NF membrane (less than 11 LMH/bar).

Figure 7:
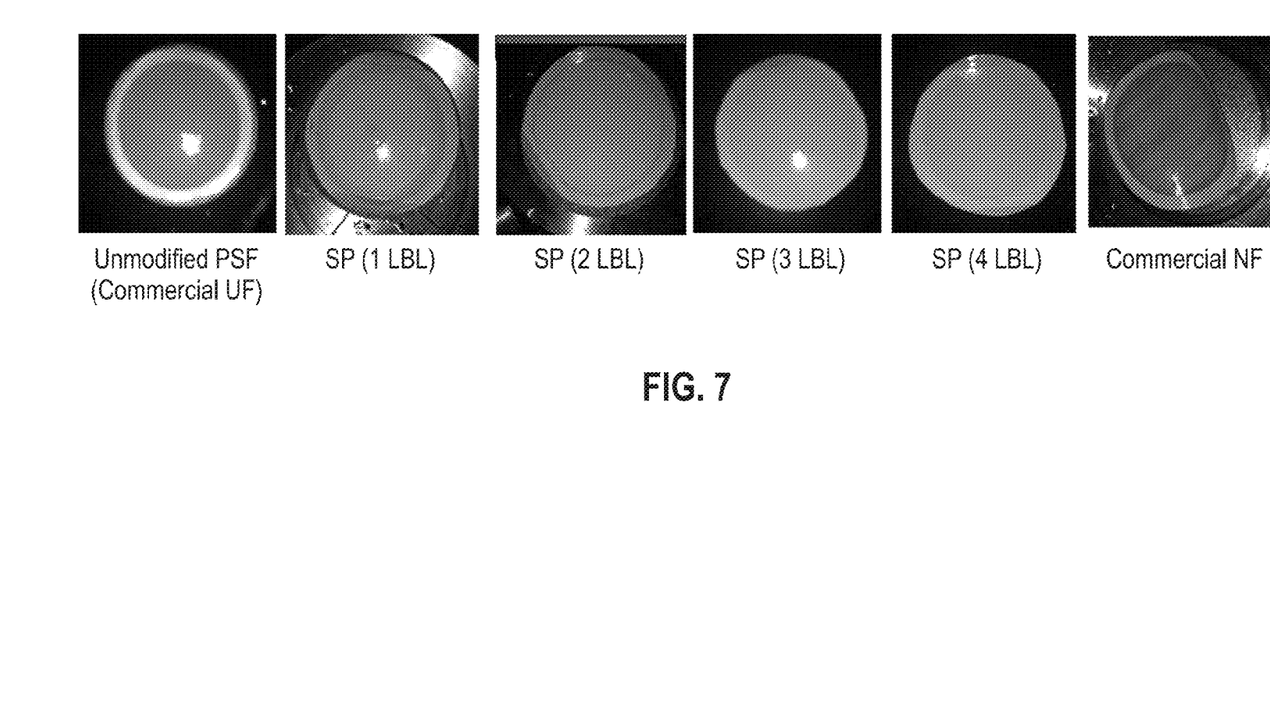
FIG. 7 is a series of photographs of various membrane surfaces (unmodified PSF, LBL-assembled star polymer membranes, and a commercial NF membrane surfaces) acquired right after a dye filtration experiment.

FIG. 7 shows photographs of membrane surface acquired right after the dye-filtration experiment. The hydrophobic PSF UF membrane showed strong adhesion (fouling) of dye-molecules on the surface, which would result in significant flux decline during a long-term filtration process. In general, a commercial NF membrane is more hydrophilic than porous UF membranes due to its surface charge ($COO^-$ functional groups on the surface of a polyamide NF membrane) so that it is less prone to surface fouling than porous PSF membrane as demonstrated in our experiment.

However, the commercial NF membrane was still more attractive for causing the deposition of organic molecules compared to LBL-assembled star polymer membranes, indicating that the high surface density of star polymers formulated with neutral hydrophilic PEG and $COO^-$ functional groups could effectively mitigate membrane fouling during nanofiltration process.

The dye-filtration study including molecular adhesion monitoring clearly demonstrates the ability of LBL-assembled star polymers to act as an effective active layer for a fouling-resistant, high flux nanofiltration membrane.

Various embodiments of the invention have been described. These and other embodiments are within the scope of the following claims.

The invention claimed is:

1. A thin film composite membrane (TFC) comprising a water-permeable active filtration layer on a porous support membrane with an average pore diameter of about 1 nm to about 100 nm, wherein the active layer comprises at least 8 barrier layers of star-polymers having an alternating charge, each of the barrier layers having a thickness between 5 and 50 nm, wherein the star-polymers comprise at least three linear polymers attached at a central core, and wherein at least one of the barrier layers comprises a positively charged star-polymer with an ammonium moiety and at least one of the barrier layers comprises a negatively charged star polymer with a carboxyl moiety.

2. The membrane of claim 1, wherein the barrier layers adhere to one another with electrostatic interaction.

3. The membrane of claim 1, wherein at least one of the barrier layers of alternating layers of star polymers adhere to one another with hydrogen-bonding.

4. The membrane of claim 2, wherein at least one of the barrier layers comprises an electrically neutral hydrophilic surface functional moiety.

5. The membrane of claim 4, wherein the neutral hydrophilic surface functional moiety is polyethylene glycol.

6. The membrane of claim 1, wherein the support membrane has an average pore diameter of about 5 to about 20 nm.

* * * * *